(12) United States Patent
Manfredi et al.

(10) Patent No.: US 8,200,379 B2
(45) Date of Patent: Jun. 12, 2012

(54) SMART RECOVERY SYSTEM (76) Inventors: Dario P. Manfredi, Berkeley Heights, NJ (US); Robert La France, Colorado Springs, CO (US)

( * ) Notice: Subject to any disclaimer, the term of this patent is extended or adjusted under 35 U.S.C. 154(b) by 632 days.

(21) Appl. No.: 12/322,968

(22) Filed: Feb. 10, 2009

(65) Prior Publication Data

US 2010/0004803 A1  Jan. 7, 2010

Related U.S. Application Data (60) Provisional application No. 61/133,917, filed on Jul. 3, 2008.

(51) Int. Cl.
 *G06F 7/70* (2006.01)

(52) U.S. Cl. ............. 701/14; 701/9; 701/11; 244/122 A; 244/138 R; 244/194; 244/195; 244/196; 340/963

(58) Field of Classification Search ................ 701/9, 11, 701/14; 244/122 A–122 AH, 138 R–152, 244/194–196; 340/963
See application file for complete search history.

(56) References Cited

U.S. PATENT DOCUMENTS

| 4,607,814 | A | 8/1986 | Popov | |
|---|---|---|---|---|
| 7,271,713 | B2 * | 9/2007 | Ayoub et al. | 340/471 |
| 7,984,878 | B2 * | 7/2011 | Hirvonen | 244/194 |
| 2005/0183869 | A1 | 8/2005 | Lazzarini | |
| 2006/0108473 | A1 | 5/2006 | Phanumphai | |
| 2006/0220883 | A1 | 10/2006 | Matos | |
| 2008/0039988 | A1 | 2/2008 | Estabrook et al. | |
| 2008/0103644 | A1 | 5/2008 | Oberg et al. | |
| 2008/0142635 | A1 | 6/2008 | Manfredi et al. | |

FOREIGN PATENT DOCUMENTS

| DE | 4421139 A1 | 12/1995 |
|---|---|---|
| EP | 0869058 A | 10/1998 |

* cited by examiner

*Primary Examiner* — Thomas Black
*Assistant Examiner* — Luke Huynh
(74) *Attorney, Agent, or Firm* — Dilworth & Barrese, LLP (57) ABSTRACT This invention relates to an intelligence system on board an aircraft that detects an emergency, assesses the situation, and then acts on the situation in a pre-determined manner.

20 Claims, 8 Drawing Sheets

SMART RECOVERY SYSTEM

PRIORITY INFORMATION

This application claims benefit of priority to provisional application Ser. No. 61/133,917 filed Jul. 3, 2008 titled Smart Recovery System, which is hereby incorporated by reference in its entirety.

TECHNICAL FIELD

The present disclosure generally relates to recovery systems for general, military, and commercial aviation and unmanned aerial vehicles, and more particularly to an intelligence system on board an aircraft that detects an emergency, assesses the situation, and then acts on the situation in a pre-determined manner.

BACKGROUND

Aircraft emergencies such as in-flight failure of control surfaces (ailerons, elevators, rudders, horizontal stabilizers, vertical stabilizers, or other components), an in-flight fire, uncontrollable dives, spins or spins, fuel exhaustion, oxygen delivery system failure, cabin decompression in pressurized aircraft, or pilot disorientation often result in a situation wherein an aircraft must respond in a timely manner in order to avoid catastrophe.

Safety systems which are manually activated by the pilot or a member of the flight crew may be ineffective in situations in which the pilot and flight crew become incapacitated, unaware of an emergency, or are otherwise unable to take control of a particular situation. Indeed, when an emergency arises, the pilot and flight crew may very well be unable to assess the situation, and further may not be capable of deploying the correct device or system in a timely manner.

Therefore, it would be desirable to provide a smart recovery system for general, military and commercial, aviation and unmanned aerial vehicles which detects an emergency, assesses the situation, and then acts on the situation in a pre-determined manner. Desirably, the smart recovery system senses the environment in which the aircraft is operating and then makes decisions based on monitoring data. It would also be desirable if such a smart recovery system could evaluate an emergency situation, identify what devices and systems are available on the aircraft, and then deploy the appropriate device and/or system in the safest, most expeditious manner. It would also be desirable if such a smart recovery system were activated automatically. It would be furthermore desirable if the pilot or a member of the flight crew, in certain situations, may override such a smart recovery system. It would also be desirable if the pilot or aircrew could manually select a safety system to function.

SUMMARY OF THE INVENTION

The system of the present invention includes an environmental sensor(s) to monitor the aircraft as it is operated on the ground or travels through the air including, for example, at least one environmental system, including, but not limited to, altitude sensor, airspeed sensor, vertical velocity sensor, or attitude sensor coupled to communicate with at least one processor. In each case, signals sent from the processor are received by particular safety and/or flight control devices or systems to employ such devices or systems in responding to an emergency. It is envisioned that the processor may be any processor capable of processing information relating to the altitude of the aircraft, the airspeed of the aircraft, the vertical velocity of the aircraft, or attitude of the aircraft; and processing such information to determine which of the various safety and flight control devices and/or systems aboard the aircraft to utilize in response to a condition detected by the environmental sensor(s). The installation of the environmental sensor (s) and processor should be apparent to a person skilled in the art. It is understood that the system of the present invention may include additional sensors for detecting environmental conditions such as, for example, thermal sensors, pressure sensors, and pressure sensors, without departing from the spirit of the invention. The system of the present invention may include at least one sensor for detecting pilot incapacitation or loss of control coupled to communicate with a processor to monitor the pilot or member of the flight crew. Information received by the processor is processed to determine which of the various safety and flight control devices and/or systems aboard the aircraft to utilize in response to conditions detected by the sensor(s) for detecting pilot incapacitation or loss of control.

The system of the present invention also includes sensors for detecting the conditions aboard the aircraft or inside various compartments aboard the aircraft, including, for example, at least one fire sensor, smoke sensor, sensors for monitoring control surfaces, or a sensor(s) for monitoring flight controls coupled to communicate with at least one processor. It is envisioned that the processor may be any processor capable of processing information relating to fire aboard the aircraft, smoke aboard the aircraft, the status of the control surfaces of the aircraft, aircraft attitude, cabin pressure, whether the aircraft is under the pilot's control, and whether a pilot has become incapacitated; and processing such information to determine which of the various safety and flight control devices and/or systems aboard the aircraft to utilize in response to conditions for detecting conditions aboard the aircraft. The installation of the sensors for detecting the conditions aboard the aircraft and the processor should be apparent to a person skilled in the art.

It is understood that the system of the present invention may include additional sensors for detecting conditions aboard the aircraft such as, for example, noise sensors, UV sensors, airspeed sensors, altitude sensors (to detect altitude above sea level), ground proximity sensors (to detect altitude above the ground), attitude sensors, vertical velocity sensors, heading sensors, stall sensors, spin sensors, engine RPM sensors, vibration sensors, carbon monoxide (CO) sensors, cabin pressure/decompression sensors, motion sensors (to, for example, observe crew movement), light sensors (to, for example, tell if it is dark and light are on or not), temperature sensors, humidity sensors, control surface sensors (for determining, for example, presence, performance, deflection, and symmetry), smoke sensors, fire sensors, acceleration sensors (G-Force sensing), and radiation sensors, without departing from the spirit of the invention.

The system of the present invention continually receives feedback from the environmental sensor(s) which monitor the aircraft as it travels through the air or operates on the ground, the sensor(s) which monitor the pilot, and the sensor(s) which detect conditions aboard the aircraft. Specifically, the system of the present invention includes a processor, which receives information from each of the sensors (monitoring data) and compares that flight data against normal operating flight data for that particular aircraft. Data received by the processor that differs from normal operating flight data may indicate an emergency.

In one embodiment of the present invention, the processor includes a flight data record having a memory which is used to store data, software, logic routine instructions, computer programs, files, operating system instructions, and the like. It is understood that the flight data record can receive data from several devices and can comprise volatile and non-volatile memory components. Thus, the flight data record can include, for example, random access memory (RAM), read only memory (ROM), hard disks, floppy disks, optical disks (including, but not limited to, CDs and DVDs), tapes, and/or other memory components, plus associated drives and players for these memory types. Software used to carry out the functions described herein can be broken-up so that different parts can be selectively executed by the processor or, if present, among multiple processors.

In one embodiment of the present invention, the processor and the flight data record are coupled using a local interface. The local interface can be implemented with a data bus with an accompanying control bus or a network, for example. The system of the present invention may include a video interface for driving the local interface, such as, for example, a touch screen. The video interface can be, for example, a video card that operatively connects the touch screen to the local interface. In one embodiment, the screen can be driven to display full motion video images.

The system will determine what devices and/or systems are available on the aircraft to address a specific emergency. The system of the present invention will then make a decision based on monitoring data and the devices and/or systems available to deploy the devices and/or systems to best respond to the emergency.

In one embodiment of the present invention, the processor includes software executing on a conventional digital computer to receive signals from the sensors of the smart recovery system representative of the particular condition each sensor is configured to detect. In one embodiment of the present invention, the processor is connected to the sensors of the smart recovery system via an electrical connection. In another embodiment of the present invention, the processor is connected to the sensors of the smart recovery system via a wireless connection. The processor is also configured to transmit signals to the various safety and flight control systems present on the aircraft. In one embodiment of the present invention, the processor is connected to the various safety and flight control systems present on the aircraft via an electrical connection. In another embodiment of the present invention, the processor is connected to the various safety and flight control systems present on the aircraft via a wireless connection. In yet, another embodiment the processor is connected to the various safety and flight control systems present on the aircraft via a combination of wireless and electrical connections.

Processors and digital computers that may be used in accordance with the present invention should be apparent to a person skilled in the art. The processor interfaces the various safety and flight control systems present on the aircraft via signals that are transmitted from the processor to the various safety and flight control systems present on the aircraft. Once the smart recovery system determines how to respond to an emergency, the processor transmits signals which are received by such systems, which allow the smart recovery system to deploy, for example, fire extinguisher systems, flight control systems, ballistic parachute recovery systems, and flight control systems, to respond to the emergency. It is contemplated that the system of the present invention may utilize more than one processor.

Devices and systems available on an aircraft that the smart recovery system of the present invention may utilize to rectify an emergency include, but are not limited to, fire suppression agents, fire extinguisher systems, flight control systems, parachutes, ballistic parachute recovery systems, drogue/drag chutes, pyrotechnic and electromechanical separation devices and actuators, rocket members, pyrotechnic or electronic time delays, sequencing devices, alarms and warning systems, airbags, emergency locator beacons/transmitters, global positioning systems, and auto pilot.

For example, fire suppression agents suppress and/or extinguish a fire aboard the aircraft. Likewise, fire extinguisher systems suppress and/or extinguish a fire aboard the aircraft. Flight control systems control the various mechanisms of the aircraft that control the flight of the aircraft. Ballistic parachute recovery systems help to reduce the downward speed of the fall of the aircraft during an in-flight emergency. The drag chutes help in reducing the forward speed or the aircraft. The drogue/drag parachute may be used for reducing the downward speed of the fall of the aircraft, the forward speed of the aircraft, or both. The airbags help in reducing the impact of the aircraft on landing.

In one embodiment of the present invention, the smart recovery system is configured for use with modular aircraft, which contain a plurality of sections including, for example, a fuselage section, and detachable wings, which are configured to separate in flight. One such aircraft safety system which utilizes wing-release mechanisms to release wings from a fuselage is described in U.S. Patent Publication No. 2008/0142635 A1 to Manfredi, et al., the contents of which are incorporated herein by reference. In particular, in modular aircraft, the smart recovery system may deploy sections of the aircraft, as needed, in a sequence that addresses the emergency. For example, the smart recovery system may deploy the right wing and the left wing from the main fuselage, in sequence, in response to an emergency. Accordingly, the various parts of a modular plane provide the smart recovery system with options to address an emergency not available with planes that are essentially one piece.

In another embodiment of the present invention, the smart recovery system is configured for use with aircraft equipped with a ballistic parachute recovery system, such as ASR's Tri-Chute Safe Landing System or the BRS Ballistic Recovery System described in U.S. Pat. No. 4,607,814 to Popov, the contents of which are incorporated herein by reference. In particular, in aircraft equipped with a ballistic parachute recovery system, the smart recovery system of the present invention will activate the ballistic parachute recovery system automatically, in response to an emergency situation, in a sequence that best addresses the emergency.

In one particular embodiment of the present invention, the smart recovery system notifies a pilot or crewmember via a warning that it will take the necessary action(s) to rectify an emergency situation detected by the system if the pilot fails to respond, and then prompt the pilot or crewmember to respond. In one embodiment of the present invention the warning is visible. In another embodiment of the present invention the warning is audible. In one particular embodiment of the present invention the warning is both visible and audible. If the pilot or crewmember fails to respond to the warning, the smart recovery system will act in a pre-determined manner to rectify the situation and recover the aircraft. If, on the other hand, the pilot or crewmember responds to the warning issued by the smart recovery system, the pilot or crewmember may override the system to rectify the situation manually.

In yet another embodiment of the present invention, the smart recovery system will notify a pilot or crewmember that it will take the action(s) necessary to rectify an emergency situation detected by the system, but will not provide the pilot or crewmember an opportunity to respond if the emergency is determined to be imminent. If an emergency situation is likely to occur before the pilot or a member of the flight crew could respond, the smart recovery system will automatically act in a pre-determined manner to rectify the situation and recover the aircraft; a pilot or crewmember is not permitted to override the system to rectify the situation manually.

In one particular embodiment, in accordance with the principles of the present disclosure, an aircraft recovery system is provided. The aircraft recovery system includes a processor. At least one environmental sensor is configured to monitor at least one environmental condition of an aircraft communicating a signal representative of at least one environmental condition to the processor. At least one device is disposed with the aircraft and configured to address an emergency. At least one device communicates with the processor. The processor determines the presence of an emergency based on the representative signal from at least one environmental sensor. The processor further identifies a device from at least one device disposed with the aircraft to address the emergency. The processor further deploys the device identified.

At least one environmental sensor can determine at least one of the group consisting of: altitude, airspeed, vertical velocity, and attitude. The identified device can include at least one from the group consisting of: fire suppression agents, fire extinguisher systems, flight control systems, drag chutes, rocket members, air bags, pyrotechnic and electromechanical separation devices and actuators, pyrotechnic or electronic time delays, sequencing devices, alarms and warning systems, airbags, and ballistic parachute recovery systems. The system may include at least one sensor configured to monitor pilot incapacitation or loss of control that communicates a signal representative of pilot incapacitation or loss of control with the processor. The presence of an emergency is based on the representative signal from at least one environmental sensor and/or at least one sensor configured to monitor pilot incapacitation or loss of control.

Alternatively, the system may include at least one sensor configured to monitor conditions aboard the aircraft that communicates a signal representative of at least one condition aboard the aircraft with the processor. The presence of an emergency is based on the representative signal from at least one environmental sensor and/or at least one sensor configured to monitor the conditions aboard the aircraft.

In another embodiment a method for recovering an aircraft is provided. The method comprises the steps including: obtaining information from at least one environmental sensor configured to monitor at least one environmental condition of an aircraft, at least one environmental sensor communicating a signal representative of at least one environmental condition to a processor; inputting information obtained from at least one environmental sensor to the processor; determining the presence of an emergency based on the representative signal from at least one environmental sensor; identifying at least one device disposed with the aircraft to address the emergency; and deploying the device identified.

Alternatively, the method further comprises at least one sensor configured to monitor pilot incapacitation or loss of control communicating a signal representative of pilot incapacitation or loss of control to the processor. The presence of an emergency is determined based on the representative signal from at least one environmental sensor and/or the signal representative of pilot incapacitation or loss of control.

The method may further comprise at least one sensor configured to monitor at least one condition aboard the aircraft communicating a signal representative of at least one condition aboard the aircraft to the processor. The presence of an emergency is determined based on the representative signal from at least one environmental sensor and/or the signal representative of pilot incapacitation or loss of control and/or the signal representative of at least one condition aboard the aircraft.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION OF THE INVENTION

The exemplary embodiments of the smart recovery system are discussed in terms of recovery systems for general, military and commercial, aviation and unmanned aerial vehicles and more particularly, in terms of a smart recovery system that detects an emergency, assesses the situation, and then acts on the situation in a pre-determined manner. It is envisioned that the smart recovery system senses the environment in which the aircraft is operating and then makes decisions based on monitoring data. It is envisioned that the smart recovery system is capable of evaluating an emergency situation, identifying what preventative safety devices and systems are available on the aircraft, and then deploying them in the safest, most expeditious manner. It is contemplated that the smart recovery system is activated automatically. It is further contemplated that the pilot or a member of the flight crew may override the smart recovery system. It is envisioned that the smart recovery system may be configured for use with the various preventative safety devices and systems employed in general, military and commercial aviation and unmanned aerial vehicles.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
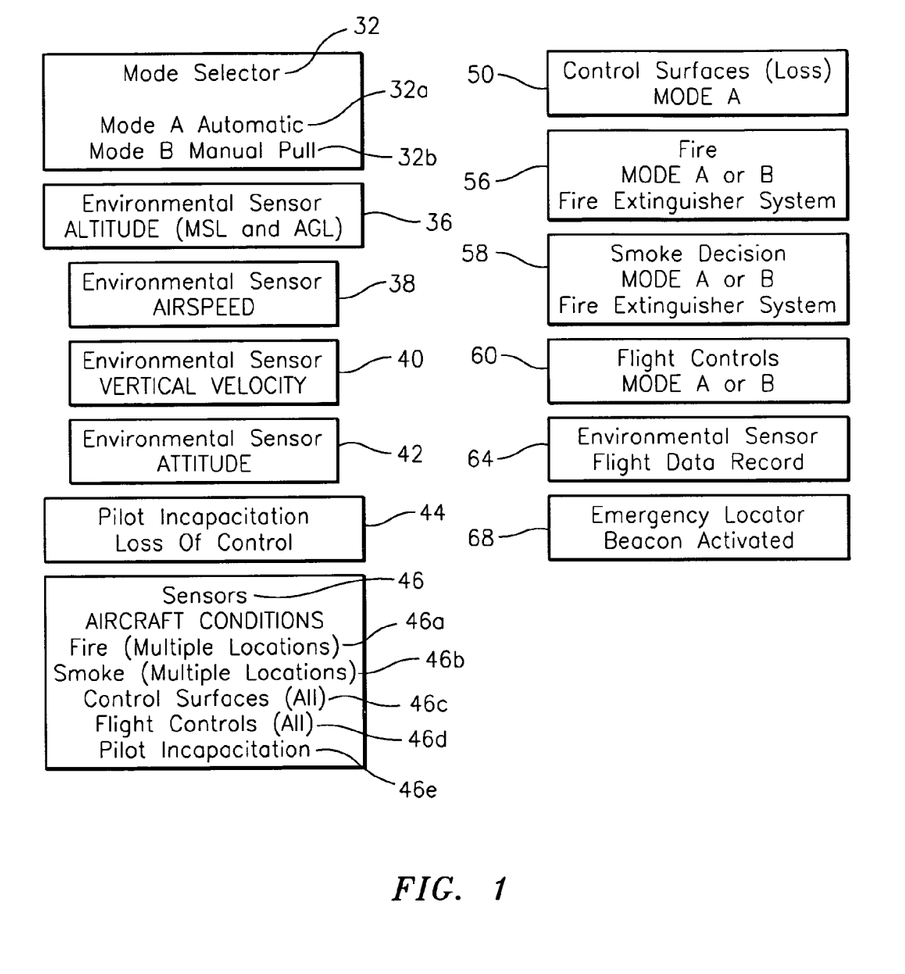
FIG. 1 is a flow diagram showing one particular embodiment of a smart recovery system, in accordance with the principles of the present disclosure.
Figure 2:
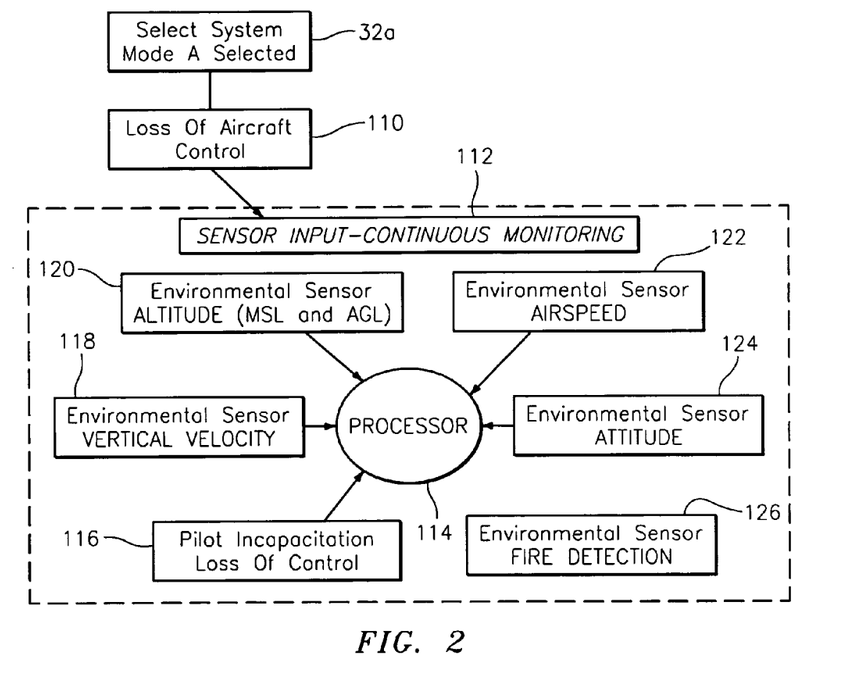
FIG. 2 is a flow diagram illustrating operation of the smart recovery system shown in FIG. 1.

The following discussion includes a description of a smart recovery system in accordance with the principles of the present disclosure. Alternate embodiments are also disclosed. Reference will now be made in detail to the exemplary embodiments of the present disclosure, which are illustrated in the accompanying figures. Turning now to FIG. 1, there is illustrated is a flow diagram showing the functions performed by the components of a the smart recovery system, in accordance with the principles of the present disclosure, for employment with aircraft including, but not limited to, general, military and commercial aviation vehicles, freight aircraft, passenger aircraft, military aircraft, and unmanned aerial vehicles.

In one embodiment, the smart recovery system includes at least one altitude sensor 36, airspeed sensor 38, vertical velocity sensor 40, attitude sensor 42, control sensor 44, and a plurality of aircraft condition sensors 46 which are each coupled to communicate with a processor. In particular, the processor includes software executing on a conventional digital computer to receive signals from altitude sensor 36, airspeed sensor 38, vertical velocity sensor 40, attitude sensor 42, control sensor 44, and a plurality of aircraft condition sensors 46 representative of the particular condition each sensor is configured to detect. A processor 114 is used to execute logical instructions, such as in the form of computer code (e.g., software applications). For example in one embodiment, processor 114 is a PENTIUM III general purpose microprocessor available from the Intel Corporation, but other general purpose processors can be used.

It is contemplated that the smart recovery system may facilitate communication with processor 114 via a touch screen that serves as a visual output device and user input device. The system of the present invention may also include buttons that serve as user input devices. Processor 114 may include at least one local interface, at least one interface to connect to legacy devices within the aircraft, such as, for example, a GPS unit, and at least one interface to connect to additional input devices and/or communicate with a network or networks. A flight data record includes a memory that stores data collected by altitude sensor 36, airspeed sensor 38, vertical velocity sensor 40, attitude sensor 42, control sensor 44, fire sensor 46a, smoke sensor 46b, control surfaces sensor 46c, flight controls sensor 46d, and pilot incapacitation sensor 46e; and processed by processor 114. Data stored in the flight data record is compared against data collected during previous flights to determine if/when an emergency situation arises. Moreover, data stored in the flight data record is subsequently used to determine a course of action in responding to an emergency event. The system of the present invention may also include support circuitry and power supplies for these components. In one embodiment, the system of the present invention includes a main housing, which can accommodate a plurality of processors 114.

Aircraft condition sensors 46 include at least one fire sensor 46a, smoke sensor 46b, control surfaces sensor 46c, flight controls sensor 46d, and pilot incapacitation sensor 46e. Altitude sensor 36, airspeed sensor 38, vertical velocity sensor 40, and attitude sensor 42 monitor the environment in which the aircraft is operating. Control sensor 44 monitors the pilot to detect pilot incapacitation or loss of control. Aircraft condition sensors 46 monitor the aircraft itself.

In particular, altitude sensor 38 monitors the altitude of the aircraft. Vertical velocity sensor 40 monitors the vertical velocity of the aircraft. Attitude sensor 42 monitors the attitude of the aircraft. It is understood that altitude sensor 36, airspeed sensor 38, vertical velocity sensor 40, attitude sensor 42, control sensor 44, and aircraft condition sensors 46 may include any device capable of monitoring or measuring altitude, airspeed, vertical velocity, attitude, and aircraft conditions, respectively.

Likewise, fire sensor 46a detects fire aboard the aircraft. Smoke sensor 46b detects smoke aboard the aircraft. Control surfaces sensor 46c detects if a particular control surface is operating properly. Flight controls sensor 46d detects if the aircraft is under the pilot's control. Pilot incapacitation sensor 46e detects if a pilot is incapacitated. It is understood that fire sensor 46a, smoke sensor 46b, control surfaces sensor 46c, flight controls sensor 46d, and pilot incapacitation sensor 46e may include any device capable of detecting fire aboard the aircraft, detecting smoke aboard the aircraft, detecting if control surfaces are present and operating properly, detecting if the aircraft is under the pilot's control, and detecting if a pilot has become incapacitated, respectively.

The installation of altitude sensor 36, airspeed sensor 38, vertical velocity sensor 40, attitude sensor 42, control sensor 44, fire sensor 46a, smoke sensor 46b, control surfaces sensor 46c, flight controls sensor 46d, and pilot incapacitation sensor 46e should be apparent to a person skilled in the art. In particular, it is envisioned that altitude sensor 36, airspeed sensor 38, vertical velocity sensor 40, attitude sensor 42, control sensor 44, fire sensor 46a, smoke sensor 46b, control surfaces sensor 46c, flight controls sensor 46d, and pilot incapacitation sensor 46e may be installed in any type of aircraft, regardless of, for example, size or method of propulsion, without interfering with the stock systems present on the aircraft. In another embodiment of the present invention, the smart recovery system may utilize sensors present on the stock aircraft to measure altitude, measure airspeed, measure vertical velocity, measure attitude, and aircraft conditions, detect fire aboard the aircraft, detect smoke aboard the aircraft, detect if control surfaces are operating properly, detect if the aircraft is under the pilot's control, and to detect if a pilot has become incapacitated.

As shown in FIG. 1, the pilot of the aircraft or a member of the flight crew selects to arm the system by selecting either automatic mode 32a or manual mode 32b at step 32. It is envisioned that the pilot or member of the flight crew may select either automatic mode 32a or manual mode 32b prior to take-off or in flight. It is also envisioned that the pilot or member of the flight crew may alternate between automatic mode 32a and manual mode 32b, as desired. When automatic mode 32a is selected, the smart recovery system responds to data collected by the system autonomously. In particular, the system will arm the various safety devices and systems aboard the aircraft and deploy the appropriate device(s) and/or system(s), if an emergency arises. If, on the other hand, manual mode 32b is selected, the smart recovery system arms all safety devices and systems aboard the aircraft and makes each of them available to the pilot or aircrew member of individual selection. The system will not deploy the appropriate device(s) and/or system(s) in the event of an emergency, without input from the pilot or aircrew. Indeed, when the system is in manual mode, the system will notify the pilot or aircrew of an emergency and indicate the various safety devices and systems aboard the aircraft to respond to the emergency, and then allow the pilot or aircrew to make their own assessment of the emergency situation, to determine how to respond to the emergency, rather than allowing the processor to decide.

Selecting automatic mode 32a activates altitude sensor 36, airspeed sensor 38, vertical velocity sensor 40, and attitude sensor 42, which each function to monitor the environment in which the aircraft is operating. Selecting automatic mode 32a also activates control sensor 44, which detects pilot incapacitation or loss of control.

If control surfaces sensor 46c detects that a particular control surface is not present or is not operating properly, such information is transmitted via a signal, which is received by the processor. The smart recovery system processes the information received by control surfaces sensor 46c to then automatically act on the situation in a pre-determined manner at step 50 to correct the problem.

It is contemplated that the present invention is employed to save the passengers and crew from catastrophe. For example, if an aileron separates for the aircraft, the pilot would be requested to act. This may or may not be a disaster, but the pilot needs to be informed. If the pilot selects for the smart recovery system to take over and save the airplane, then the smart recovery system would make its assessment of what safety systems to deploy.

In particular, the smart recovery system receives signals from control surface sensor 46c when control surface sensor 46c detects an abnormality. The information is transmitted to the processor, which processes such information and then identifies devices and/or systems available on the aircraft to address the abnormal situation. In that the processor is also configured to transmit signals to the various safety and flight control devices or systems aboard the aircraft to address an emergency, the system may deploy and/or control a specific system or device. For example, if an aileron on the left wing is not functioning properly or has separated from the aircraft, the smart recovery system may reposition the aileron on the right wing by interfacing with the aircraft's flight control system to compensate for the non-functioning aileron and, in doing so, place the aircraft in a level attitude where the pilot is notified to take action. If no action is taken the smart recovery system begins its predetermined recovery sequence. However, it is understood that the manner in which the smart recovery system responds to a situation depends on, inter alia, the situation at hand and the devices and systems available on the aircraft.

Should fire sensor 46a detect fire on board the aircraft, such information is transmitted via a signal, which is received by the processor. The smart recovery system processes the information received by fire sensor 46a to automatically act on the situation in a pre-determined manner by, for example, deploying fire suppression agents at step 56.

For example, the smart recovery system will detect an emergency situation by receiving information from each of the sensors (monitoring data) and comparing that data against normal operating flight data for that particular aircraft, and respond to the situation utilizing the devices and systems aboard the aircraft in a manner that is determined to save the passengers and crew from catastrophe. For example, if fire is detected by the smart recovery system in a wing of the aircraft where a fire suppression system is located, the smart recovery system functions the fire suppression system to dispense an agent to suppress the fire into the engine nacelle, or compartment aboard the aircraft. No components would be jettisoned due to fire/smoke if it were in an area with a fire suppression system, as suppressing the fire would be more likely to save the passengers and crew from catastrophe than jettisoning a wing. If, however, the smart recovery system detects fire in the wing (or other area of an aircraft) where fire suppression agents are not present, the smart recovery system will determine whether the area of the aircraft where fire is detected could be jettisoned, to prevent the fire from spreading to areas of the aircraft where passengers and crew are located, to save the passenger and crew from catastrophe. In either event, the system of the present invention will initiate a response, which is determined by the system to be the best way available to save the passengers and crew from catastrophe, based on both the emergency situation and the devices and systems available on the aircraft.

In particular, the processor of the present invention receives signals from fire sensor 46a such that when fire sensor 46a detects a fire, the information is transmitted to the processor, which processes such information and then identifies devices and/or systems available on the aircraft to extinguish the fire. In that the processor is also configured to transmit signals, which are received, by the various safety and flight control devices or systems aboard the aircraft, the system may take control of a specific system or device to address the emergency (fire). The smart recovery system will provide a warning prompting the pilot or a member of the flight crew to respond. If the pilot or crewmember fails to respond to the warning in a certain amount of time, the smart recovery system will act on the situation automatically. If, however, the pilot or crewmember responds before time expires, the pilot or crewmember may choose to override the system and respond to the situation manually.

In the event smoke sensor 46b detects smoke on board the aircraft, the smart recovery system will automatically act on the situation in a pre-determined manner by, for example, deploying fire suppression agents at step 58. For example, if smoke is detected by the smart recovery system in a wing of the aircraft where a fire or smoke suppression system is located, the smart recovery system functions the fire or smoke suppression system dispensing an agent to suppress fire or smoke into the area of the aircraft where smoke is detected by the system. No components would be jettisoned due to fire or smoke if it were in an area with a smoke or fire suppression system, as suppressing the smoke or fire would be more likely to save the passengers and crew from catastrophe than jettisoning a wing, in at least the situation described. If, however, the smart recovery system detects smoke in the wing (or other area of an aircraft) where smoke or fire suppression agents are not present, the smart recovery system will determined whether the area of the aircraft where smoke is detected could be jettisoned, to prevent the smoke or fire from spreading to areas of the aircraft where passengers and crew are located, to save the passenger and crew from catastrophe.

In particular, the processor of the smart recovery system is coupled to communicate with smoke sensor 46b such that when smoke sensor 46b detects smoke, the information is transmitted to the processor which processes the information and then identifies devices and/or systems available on the aircraft to quell the smoke. In that the processor is also coupled to communicate with the devices or systems aboard the aircraft, the system may take control of a specific system or device to address the aboard emergency (smoke).

The smart recovery system will provide a warning prompting the pilot or a member of the flight crew to respond. If the pilot or crewmember fails to respond in a certain amount of time, the smart recovery system will act on the situation automatically. If however the pilot or crewmember responds to the warning before time expires, he or she may override the system and address the situation manually. It is understood that the amount of time that elapses between the time a warning is issued and the time when the smart recovery system acts in response to an emergency situation detected by the system will vary depending upon, for example, the nature and severity of the emergency and flight conditions present when the emergency occurs. In one embodiment of the present invention, the amount of time that elapses between the time a warning is issued and the time when the smart recovery system acts in response to an emergency situation detected by the system is programmable. Accordingly, the smart recovery system may be programmed to act autonomously after, for example, about 1.0 second or about 1 hour, or any amount of time in between.

If flight controls sensor 46*d* detects that the aircraft is not under the pilot's control (e.g. in an unrecoverable dive or spin), such information is transmitted via a signal, which is received by the processor. The smart recovery system processes the information received by flight controls sensor 46*d* to act on the situation in a pre-determined manner at step 60. In particular, the processor of the smart recovery system receives signals from flight controls sensor 46*d* such that when flight controls sensor 46*d* detects a problem with the flight controls, the information is transmitted to the processor, which processes the information and then identifies devices and/or systems available on the aircraft to remedy the situation. In that the processor is also configured to transmit signals which are received by the various safety and flight control devices or systems aboard the aircraft, the system may take control of a specific system or device to address the aboard emergency (a problem with the flight controls). In this situation, the smart recovery system will issue a warning prompting the pilot or crewmember to respond, before automatically responding to the aboard emergency. If the pilot or crewmember fails to respond in a certain amount of time, the smart recovery system will act in a pre-determined manner at step 60, to rectify the situation and recover the aircraft. If, on the other hand, the pilot or crewmember responds to the smart recovery system, the pilot or crewmember may override the system to rectify the situation manually.

Data collected by altitude sensor 36, airspeed sensor 38, vertical velocity sensor 40, attitude sensor 42, control sensor 44, fire sensor 46*a*, smoke sensor 46*b*, control surfaces sensor 46*c*, flight controls sensor 46*d*, and pilot incapacitation sensor 46*e* is stored in a flight data record at step 64. Data stored in the flight data record is compared against data collected during previous flights to determine if/when an emergency situation arises. Moreover, data stored in the flight data record is subsequently used to determine a course of action in responding to an emergency event. If data received by altitude sensor 36, airspeed sensor 38, vertical velocity sensor 40, attitude sensor 42, control sensor 44, fire sensor 46*a*, smoke sensor 46*b*, control surfaces sensor 46*c*, flight controls sensor 46*d*, or pilot incapacitation sensor 46*e* and transmitted to the processor reveal conditions which differ from that which is stored in the flight data record (normal conditions), an emergency is indicated. When an emergency occurs, such as a pilot's failure to respond, an emergency locator beacon is activated at step 68. The flight data record also records recovery events at step 64, for later review.

In one embodiment of the present invention, the smart recovery system is configured for use with modular aircrafts that contain a plurality of sections including, for example, a fuselage section and detachable wings, which are configured to separate in-flight. One such aircraft which utilizes wing-release mechanisms to release wings from a fuselage is described in U.S. Pat. No. 5,009,374 to Manfredi, et al., the contents of which are incorporated herein by reference. In particular, in modular aircrafts, the smart recovery system may send signals from the processor to deploy sections of the aircraft, as needed, in a sequence that best addresses the emergency. For example, the smart recovery system may employ a recovery event in which the right wing and the left wing are separated from the main fuselage, in sequence. Accordingly, the various parts of a modular plane provide the smart recovery system with options to address an emergency not available with planes that are essentially one piece. Indeed, separation of the various components of the aircraft is desired in certain situations in order to safely recover the various components of an aircraft following an in-flight emergency. It is envisioned that the various components of a modular plane may be reassembled and/or reused after all of the components thereof are recovered.

In another embodiment of the present invention, the smart recovery system is configured for use with aircrafts that release a parachute affixed to the aircraft for the safe descent thereof under the action of the parachute. One such aircraft is described in U.S. Pat. No. 5,009,374 to Manfredi, et al., the contents of which are incorporated herein by reference. Specifically, the smart recovery system of the present invention may send signals from the processor to deploy a parachute affixed to the aircraft to address an in-flight emergency.

In one particular embodiment, smart recovery system is configured for use with modular aircraft equipped with a ballistic parachute recovery system, such as ASR's Tri-Chute Safe Landing System or the BRS Ballistic Recovery System. In particular, in aircraft equipped with a ballistic parachute recovery system, the smart recovery system will transmit a signal from the processor to activate the ballistic parachute recovery system, as needed, in a sequence that best addresses the emergency. In one particular embodiment of the present invention, the smart recovery system will issue a warning notifying the pilot or crewmember that the ballistic parachute recovery system will be deployed in a specific amount of time to rectify an emergency situation. If the pilot or crewmember fails to respond, the smart recovery system will act in a pre-determined manner at step 60, to deploy the ballistic recovery system and recover the components of the aircraft. If, on the other hand, the pilot or crewmember responds to the smart recovery system, the pilot or crewmember may override the system to rectify the situation manually.

For example, when an aircraft is in a straight-and-level configuration, an aircraft will better survive if a parachute recovery system is deployed. Accordingly, if the system of the present invention detects an emergency when an aircraft having a parachute recovery system is in a straight-and-level configuration, the smart recovery system may determine to deploy the parachute recovery system, if doing so is determined to be the best way available to save the passengers and crew from catastrophe, based on both the emergency situation and the devices and systems available on the aircraft.

When an aircraft is in a spin, deploying the parachute may result in the parachute wrapping around the airplane fuselage and wings. Accordingly, if an aircraft is equipped with a system that can remove wings, the system of the present invention may determine to remove one or more of the wings of the aircraft, to prevent the aircraft from spinning, if doing so is determined to be the best way available to save the passengers and crew from catastrophe, based on both the emergency situation and the devices and systems available on the aircraft.

Before the parachute(s) are deployed to slow the fall of the jettisoned section(s), airspeed sensor 36 monitors airspeed to determine whether or not the parachute(s) may be fully deployed, or stage-deployed. In aircraft equipped with the single-chute BRS Ballistic Recovery System, the aircraft will be slowed to a specific speed for successful parachute deployment. In aircraft equipped with ASR's Tri-Chute Safe Landing System, the parachutes deploy in three different modes, which are determined by the speed of the aircraft.

In aircraft equipped with ASR's Tri-Chute Safe Landing System, the smart recovery system will determine whether to jettison the wings immediately, if at all, or wait until the aircraft is slowed to a pre-determined speed. For example, similar to the above "spin" scenario, if the sensor monitoring the airspeed indicator, detects that the aircraft is in "the red line", or operating at the VNE (never exceed speed) or above, the tri chute system will receive that piece of data, and it will then compute data coming from other sensors to assess the position of the airplane by way of the angle of attack sensor, monitoring the artificial horizon aboard the aircraft, and then it would receive the vertical speed indicator (VSI) data being collected by the VSI sensor and the altitude data coming from the altitude sensor and ground proximity sensor to determine how much time the system has to function before disaster. If time allows, a drogue parachute may be deployed to slow the aircraft prior to wing separation and parachute deployment (in the case of ARS Systems), or no wings will be separated and the parachute will deploy immediately (in the case of the BRS System). If no time is allowed, the wings are separated and the parachute deployed. Moreover, the smart recovery system will assess whether sequencing the wing separation or separating only one wing is preferable. If the aircraft is not in a wings-level configuration, however, then staging the wing separation is preferred, if doing so is determined to be the best way available to save the passengers and crew from catastrophe, based on both the emergency situation and the devices and systems available on the aircraft. This method releases one wing, forcing the aircraft to roll to wings-level then separating the other wing and starting the parachute deployment process.

Once the appropriate course of action is determined, the smart recovery system will issue a warning notifying the pilot or crewmember that the ballistic parachute recovery system will be deployed in a specific amount of time to rectify an emergency situation. If the pilot or crewmember fails to respond, the smart recovery system will act in a pre-determined manner at step 60, to deploy the ballistic recovery system and recover the aircraft. If, on the other hand, the pilot or crewmember responds to the smart recovery system, the pilot or crewmember may override the system to rectify the situation manually.

In aircraft equipped with a ballistic parachute recovery system, altitude sensor 36 monitors the altitude of the aircraft and sends that information to the processor which determines how fast to deploy or sequence the parachute(s) and then sends signals to the ballistic parachute recovery system to deploy or sequence the parachute(s) in the manner determined. In aircraft equipped with ASR's Tri-Chute Safe Landing System, the altitude of the aircraft, as determined by altitude sensor 36, establishes when the wings of the aircraft should be separated, if at all. For example, if the aircraft is at or above about 14,000 feet above sea level, where breathable oxygen is required for required crewmembers, the smart recovery system will cause the aircraft to go below an altitude of about 14,000 feet, where breathable oxygen is not required, before a ballistic parachute recovery system is deployed. It should be understood, however, that the smart recovery system may be programmed to deploy the wings using a ballistic recovery system at any altitude.

In aircraft equipped with a ballistic parachute recovery system, attitude sensor 42 monitors attitude of the aircraft and sends that information to the processor to determine the sequencing of the deployment and recovery event. Sequencing of the deployment and recovery event is initiated by the system of the present invention in the manner determined to most likely save the passengers and crew from catastrophe, based on both the emergency situation and the devices and systems available on the aircraft. For example, an inverted aircraft may be returned to level or upright flight before a ballistic parachute recovery system is deployed.

In aircraft equipped with a ballistic parachute recovery system, if flight controls sensor 46d detects that the aircraft is not under the pilot's control (e.g. a pilot becomes incapacitated), such information is transmitted via a signal which is received by the processor. The smart recovery system processes the information received by flight control sensor 46d and notifies the pilot or crewmember that it will take the actions necessary to rectify the situation and stabilize the aircraft. The system prompts the pilot or crewmember to respond. If the pilot or crew member fails to respond, the smart recovery system will act in a pre-determined manner at step 60, to deploy the ballistic parachute recovery system, and activates an emergency locator beacon at step 68. Prior to deploying the parachute system, the smart recovery system will review data from the various sensors so that the aircraft is placed in the optimum recovery position, if possible, prior to parachute system deployment. If, on the other hand, the pilot or crew member responds to the smart recovery system, the pilot or crew member may override the system to rectify the situation manually, without deploying the ballistic parachute recovery system or by manually operating the recovery system safety systems.

EXAMPLE 1

One example of the present invention, as shown in FIGS. 2-5, a pilot of a Cessna 210 (a 6 seat, high-performance, retractable-gear single-engine general, military and commercial aviation aircraft) in a night flight at 2,500 feet above ground level over unpopulated terrain experiences disorientation due to loss of horizon reference, which causes the aircraft to roll left past 90 degrees. In this example, the smart recovery system of the present invention is in automatic mode 32a. In particular, an event, such as the loss of aircraft control is observed at step 110 by sensors at step 112 which continuously monitor the aircraft. In order to continuously monitor the aircraft, the smart recovery system includes at least one loss of control sensor 116, vertical velocity sensor 118, altitude sensor 120, airspeed sensor 122, attitude sensor 124, and fire detection sensor 126. The data received by loss of control sensor 116, vertical velocity sensor 118, altitude sensor 120, airspeed sensor 122, attitude sensor 124, and fire detection sensor 126 is processed and stored in processor 114.

Figure 3:
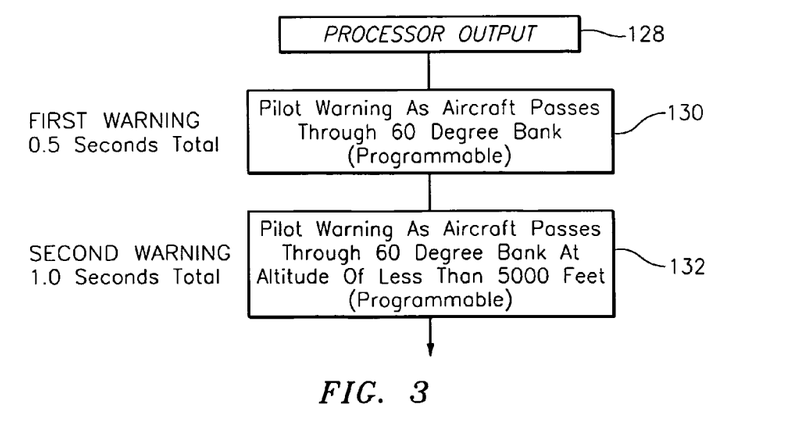
FIG. 3 is a flow diagram further illustrating operation of the smart recovery system shown in FIG. 1 under the conditions shown in FIG. 2.

The data which is processed and stored in processor 114 is output at step 128, as shown in FIG. 3. The system will determine what safety and/or flight control devices and/or systems are available on the aircraft, and deploy the particular device and/or system in a manner to best address the in-flight emergency. The smart recovery system is configured to provide a pilot or member of the flight crew with a series of warnings to which the pilot or crew member is prompted to respond, before the system will deploy a particular safety and/or flight control device to address the in-flight emergency. In one embodiment, the smart recovery system will provide a pilot or crewmember with at least one warning which to respond before the system will deploy a particular safety and/or flight control device to address the in-flight emergency. However, the smart recovery system may provide a pilot or crewmember with any number of warnings which to respond, without departing from the spirit of the present invention. If the pilot or crewmember fails to respond to the warning(s) issued by the smart recovery system, the system will act on the situation in a pre-determined manner.

The smart recovery system issues a first warning to the pilot or flight crewmember as the aircraft passes through a 60 degree bank at step 130 after about 0.5 seconds. It is envisioned that the smart recovery system may issue warnings to the pilot or a crewmember based on any criteria including, for example, airspeed, altitude, attitude, vertical velocity, loss of control, aircraft conditions, or a combination thereof. As shown in Example 1 in FIG. 3, the smart recovery system issues a second warning to the pilot or flight crewmember as the aircraft passes through a 60 degree bank at an altitude of less than 5,000 feet at step 132 after about 1.0 seconds.

Figure 4:
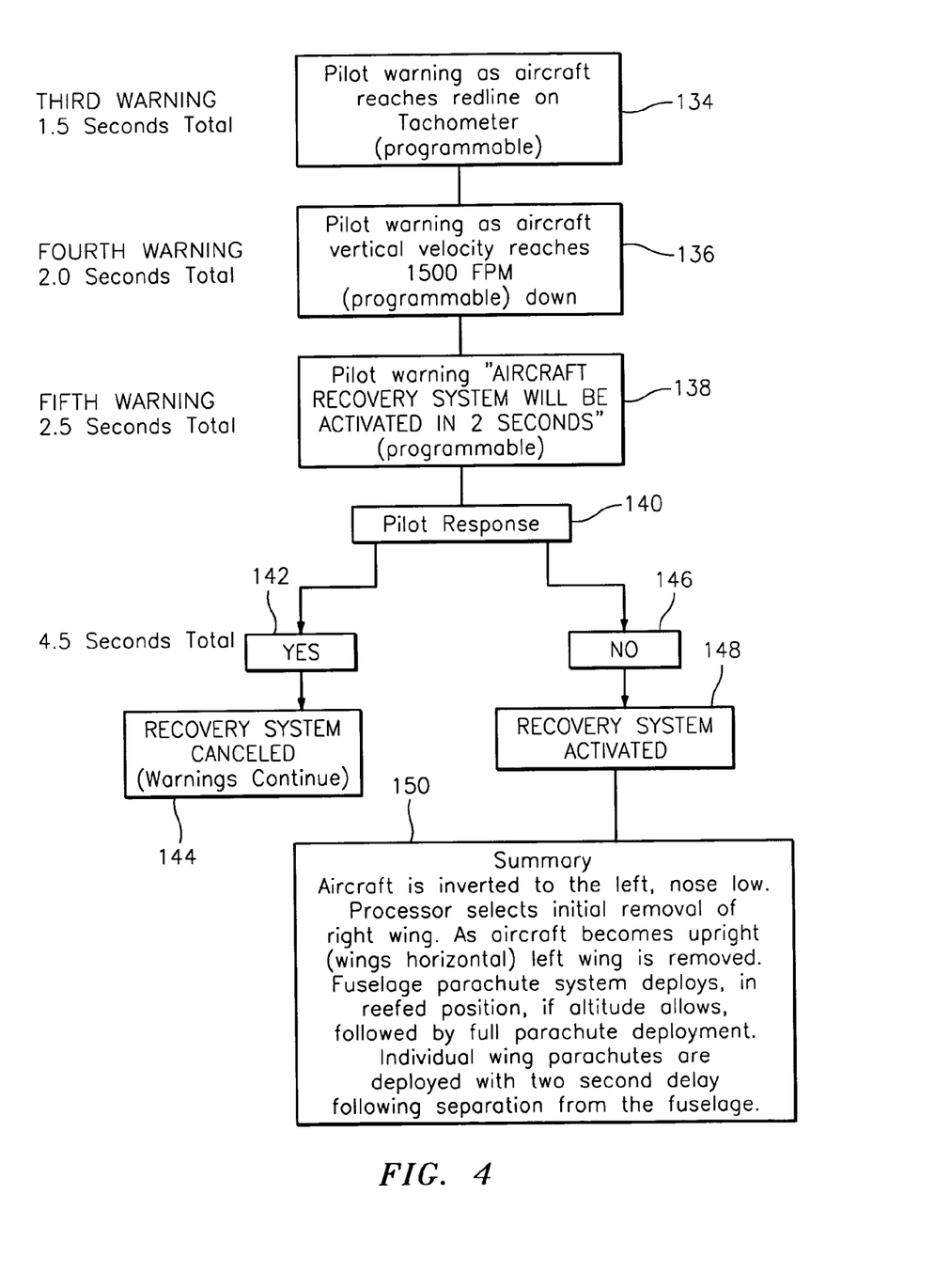
FIG. 4 is a flow diagram further illustrating operation of the smart recovery system shown in FIG. 1 under the conditions shown in FIG. 2.

The smart recovery system issues a third warning to the pilot or flight crewmember as the aircraft's airspeed reaches it's redline (or other predetermined milestone) at step 134 after about 1.5 seconds, as shown in FIG. 4. It is envisioned that the system of the present invention may be programmed to issue warnings after the occurrence of any event recognized by the processor based on data from any of the sensors thereof. The smart recovery system issues a fourth warning to the pilot or flight crewmember as the aircraft's vertical velocity reaches 1,500 feet per minute at step 136 after about 2.0 seconds. The smart recovery system issues a fifth warning at step 138 after about 2.5 seconds warning the pilot or crewmember that the smart recovery system will be activated in a certain amount of time. The smart recovery system is programmed to activate in about 2.0 seconds after the fifth warning is given at step 138. However, it is understood that the smart recovery system may be programmed to activate after any amount of time following the fifth or final warning, without departing from the spirit of the present invention.

A pilot or crewmember is prompted to respond to the fifth warning at step 140. Should the pilot or crewmember respond to the fifth warning at step 142 within a certain amount of time, the smart recovery system is cancelled at step 144. The pilot or crewmember is given 2.0 seconds from the time the fifth warning is given at step 138 to respond at step 142. It will be understood that the pilot or crewmember may be given any amount of time from the moment the fifth or final warning is given at step 138 to respond at step 142, without departing from the spirit of the present invention.

Figure 5:
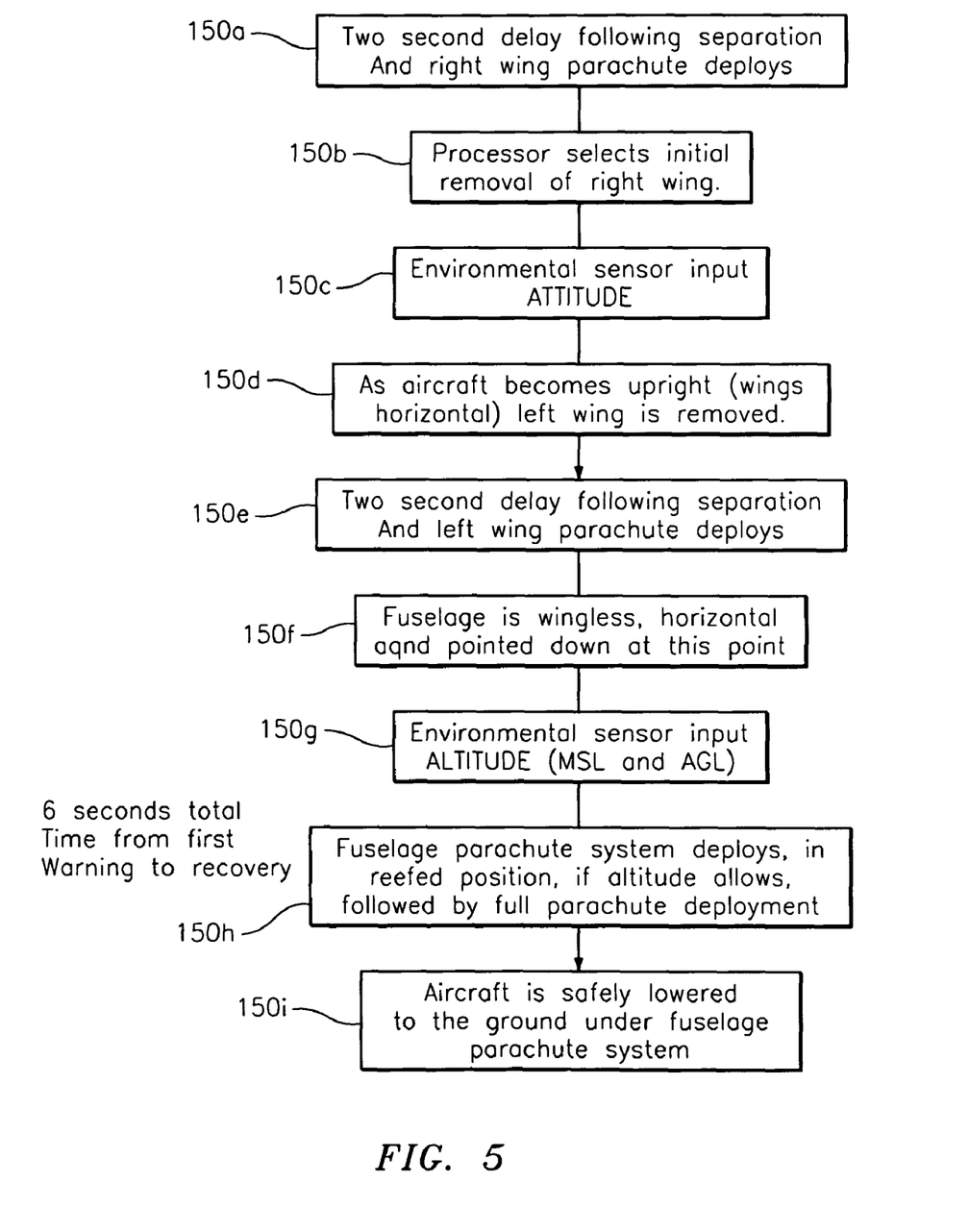
FIG. 5 is a flow diagram further illustrating operation of the smart recovery system shown in FIG. 1 under the conditions shown in FIG. 2.

Should the pilot or crewmember fail to respond to the fifth or final warning at step 146, the smart recovery system is activated at step 148. The smart recovery system sequences a recovery event at step 150 based on monitoring data for an aircraft flying at altitudes below about 14,000 feet mean sea level and above about 2,000 feet above ground level. In the recovery event at step 150, the aircraft is inverted to the left, with the nose low. The right wing is then removed at step 150*b*, as shown in FIG. 5. After about a two second delay following removal of the right wing from the fuselage, a parachute is deployed from the right wing at step 150*a* to safely lower the wing to the ground or water below. It is understood that the wing parachute(s) may be deployed at any given time following removal of the wing from the fuselage, without departing from the spirit of the invention. As the aircraft becomes upright (wings horizontal) the left wing is removed at step 150*d* in response to environmental data provided at step 150*c* from attitude sensor 42. After about a two second delay following removal of the left wing from the fuselage, a parachute is deployed from the left wing at step 150*e* to safely lower the wing to the ground or water below. After both wings are removed, a fuselage parachute system deploys at step 150*h*, in response to environmental data provided at step 150*g* from altitude sensor 36, to safely lower the fuselage to the ground or water below at step 150*i*. It is understood that whether or not the wing and fuselage parachute(s) are permitted to fully deploy is dependent upon, among other things, the altitude and airspeed of the aircraft.

In the example shown in FIGS. 2-5, the total time from the first warning to recovery is about 6.0 seconds. It is understood however that the total time from the first warning to recovery may be varied depending upon, for example, the emergency situation encountered and the recovery strategy chosen in response thereto.

In aircrafts flying at altitudes below about 2,000 feet above ground level, the smart recovery system determines a recovery strategy in which separation of the right wing from the fuselage at step 150*b* and separation of the left wing from the fuselage at step 150*d*, is followed immediately by fuselage parachute deployment at step 150*h* such that the time from the first warning to recovery is less than about 6.0 seconds.

In aircrafts flying at altitudes above about 14,000 feet mean sea level and about 2,000 feet above ground level, the smart recovery system determines a recovery strategy in which the fuselage parachute is deployed as a drogue (reefed) at step 150*h* to upright the aircraft and maintain stability until the aircraft reaches altitudes below about 14,000 feet mean sea level and above about 2,000 feet above ground level. At altitudes below about 14,000 feet mean sea level and above about 2,000 feet above ground level, and at airspeeds that allow full deployment, the fuselage parachute deploys completely. If, however, the terrain is above about 14,000 feet mean sea level, but below about 2,000 feet above ground level, the smart recovery system shall use about 2,000 feet above ground level as the critical driver, and shall deploy the parachutes in a manner in which the parachutes function in altitudes of less than about 2,000 feet above ground level. If the aircraft is traveling at speeds above the optimum or maximum full-parachute deployment speed, the parachute is deployed in stages (reefed).

EXAMPLE 2

Figure 6:
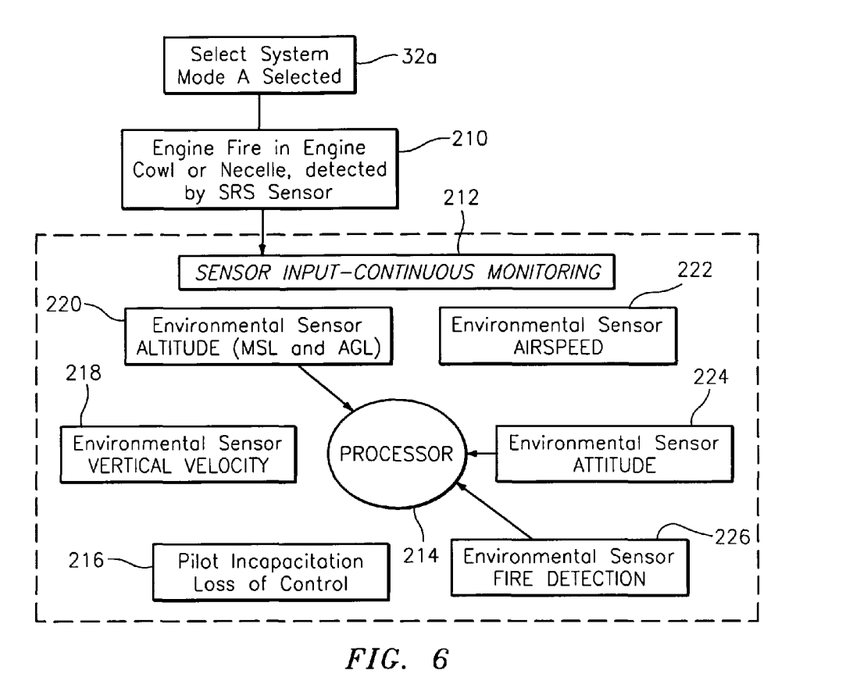
FIG. 6 is a flow diagram of an alternate embodiment illustrating operation of the smart recovery system shown in FIG. 1.
Figure 7:
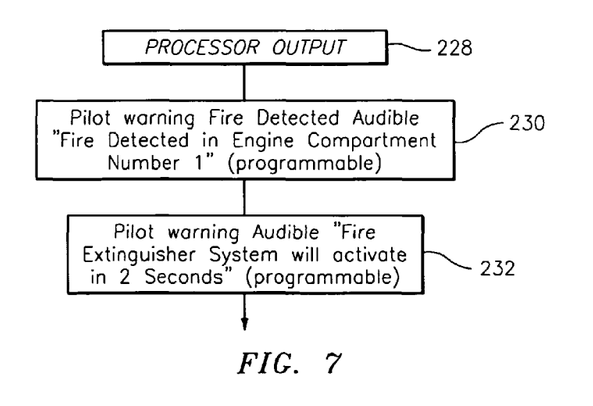
FIG. 7 is a flow diagram of an alternate embodiment illustrating further operation of the smart recovery system shown in FIG. 1 under the conditions shown in FIG. 6.
Figure 8:
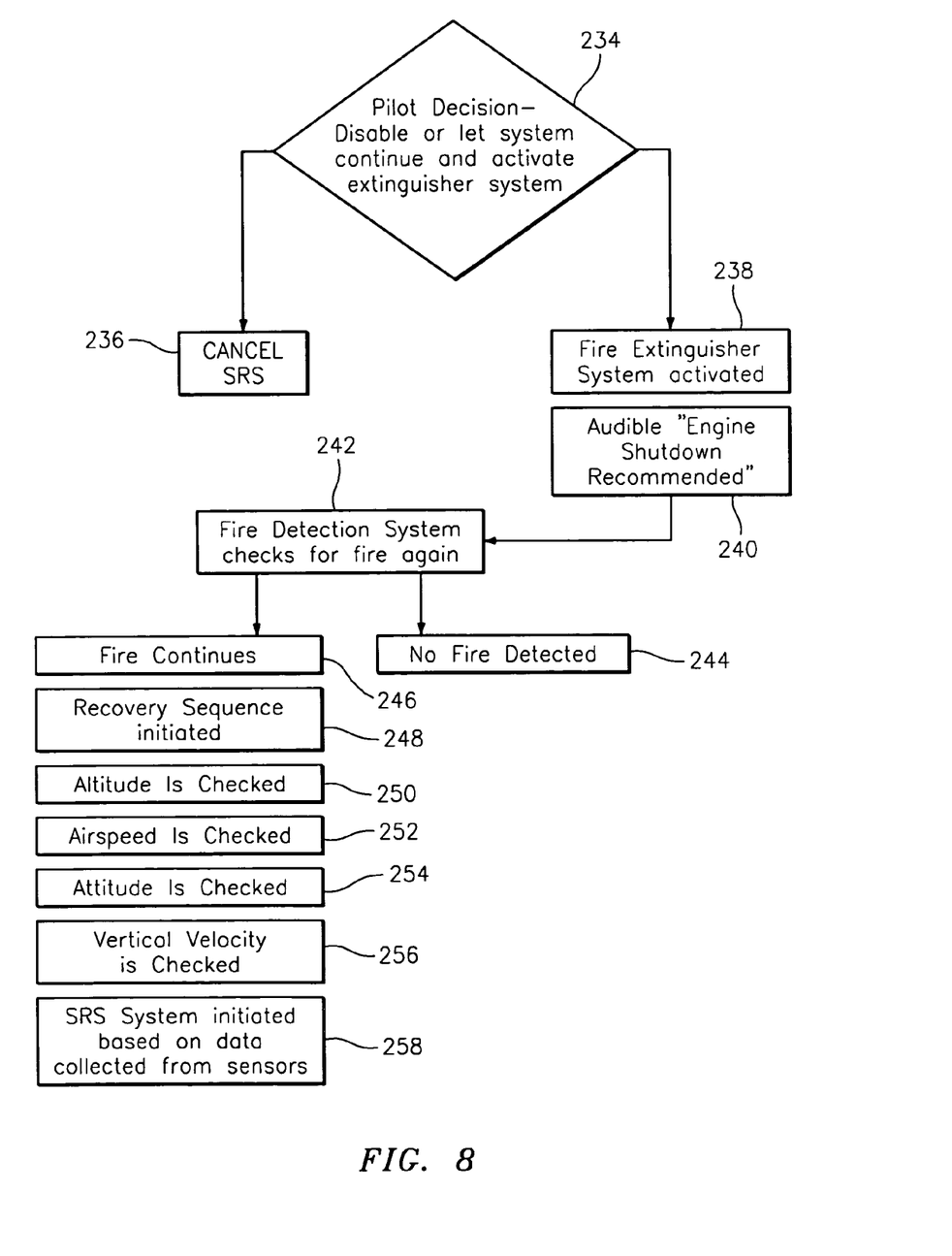
FIG. 8 is a flow diagram of an alternate embodiment illustrating further operation of the smart recovery system shown in FIG. 1 under the conditions shown in FIG. 6.

In an alternate embodiment of the present invention, shown in FIGS. 6-8, in which fire is detected in a Cessna 172 (a four-seat, single-engine, high-wing fixed-wing aircraft) or a Beechcraft King Air (a twin-turboprop aircraft) in flight at about 6,500 feet mean sea level and about 4,500 feet above ground level. The smart recovery system is in automatic mode 32*a*. In an event, such as engine fire is observed at step 210 by the smart recovery system, as shown in FIG. 6. In order to continuously monitor the aircraft in step 212, the smart recovery system includes at least one loss of control sensor 216, vertical velocity sensor 218, altitude sensor 220, airspeed sensor 222, attitude sensor 224, and fire detection sensor 226. The data received by loss of control sensor 216, vertical velocity sensor 218, altitude sensor 220, airspeed sensor 222, attitude sensor 224, and fire detection sensor 226 is processed and stored in processor 214.

The data which is processed and stored in processor 214 is output at step 228, as shown in FIG. 7. The system of the present invention then determines what safety and/or flight control devices and/or systems are available on the aircraft, and deploys the particular device and/or system in a manner to best address the in-flight emergency. In particular, the smart recovery system issues a first warning to the pilot or flight crewmember at step 230 once fire is detected by fire detection sensor 226. In one embodiment of the present invention, the smart recovery system provides an audible warning to the pilot or crewmember indicating that fire was detected aboard the aircraft. In a preferred embodiment of the present invention, the warning provided to alert a pilot or crewmember of a fire detected by fire detection sensor 226 provides the location of the fire. The smart recovery system issues a second warning at step 138 after a given time from issuing the first warning at step 136, warning the pilot or crewmember that the fire extinguisher system will be activated in a certain amount of time. The smart recovery system is programmed to activate in about 2 seconds after the second warning is given at step 232. However, it is understood that the smart recovery system may be programmed to activate after any amount of time following the second or final warning, without departing from the spirit of the present invention.

A pilot or crewmember is prompted to respond to the second warning at step 234, as shown in FIG. 8. Should the pilot or crewmember respond to the second warning at step 236 within a certain amount of time, the smart recovery system is cancelled. In the example shown in FIG. 3, the pilot or crewmember is given about 2.0 seconds from the time the second warning is given at step 232 to respond by canceling the recovery system at step 236. It will be understood that the pilot or crewmember may be given any amount of time from the moment the second warning is given at step 232 to respond at step 236, depending upon, for example, the nature and severity of the emergency, without departing from the spirit of the present invention.

Should the pilot or crewmember fail to respond to the second or final warning, the fire extinguisher system is activated at step 238, which puts the fire out. Following activation of the fire extinguisher system at step 238, the pilot or crewmember may be prompted to shut down the engine at step 240. Fire sensor 46a then checks to ensure that the fire has been put out at step 242. If no fire is detected, fire sensor 46a continues to check for fire at step 244. If however, fire sensor 46a determines that fire is present at step 246, a recovery sequence is initiated at step 248 in which environmental conditions are monitored. In particular, altitude is checked at step 250, airspeed is checked at step 252, attitude is checked at step 254, vertical velocity is checked at step 256. The smart recovery system then determines in step 258 the recovery plan based upon the data collected from altitude sensor 36 at step 250, airspeed from airspeed sensor 38 at step 252, attitude from attitude sensor 42 at step 254, and vertical velocity from vertical velocity sensor 40 at step 256.

EXAMPLE 3

Figure 9:
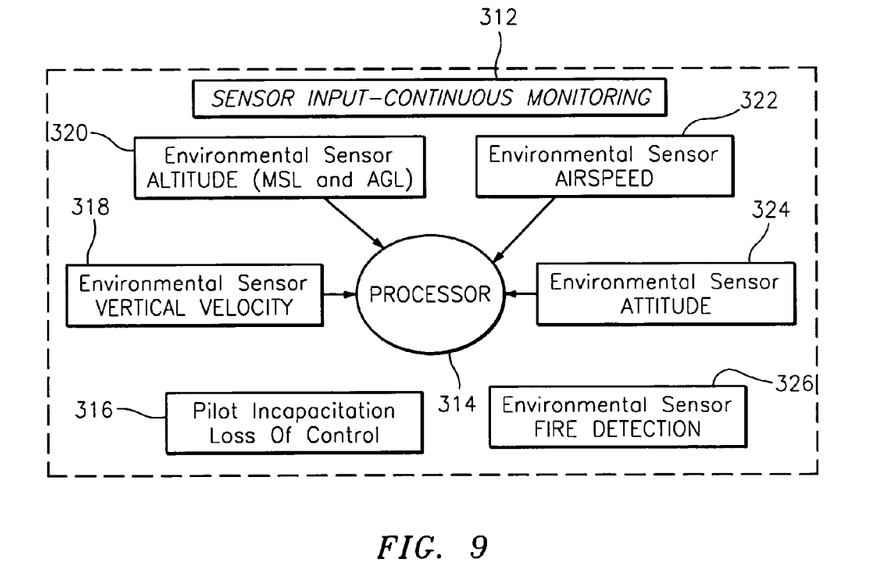
FIG. 9 is a flow diagram of another alternate embodiment illustrating operation of the smart recovery system shown in FIG. 1.
Figure 10:
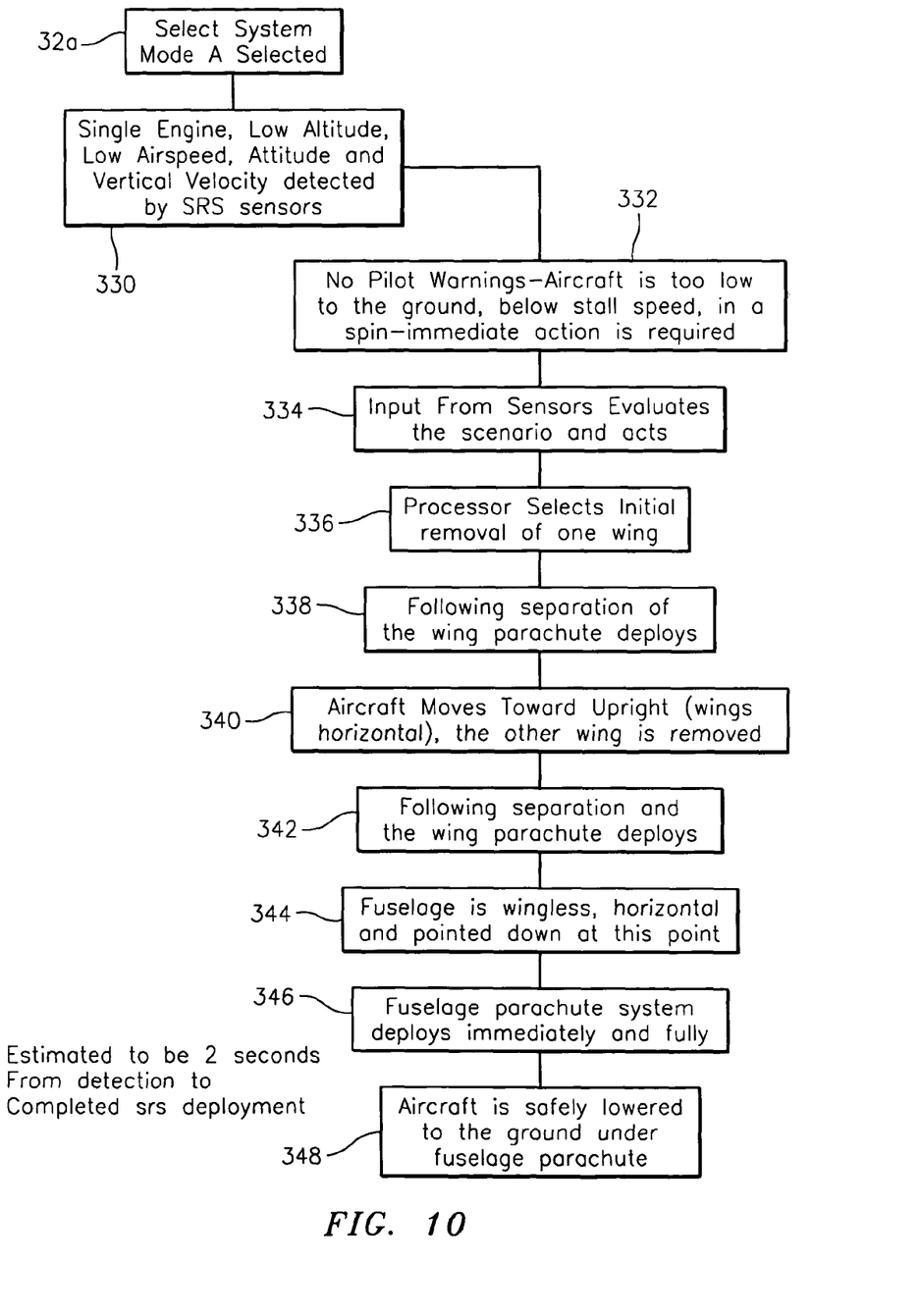
FIG. 10 is a flow diagram of another alternate embodiment illustrating further operation of the smart recovery system shown in FIG. 1 under the conditions shown in FIG. 9.

In another embodiment of the present invention in operation is shown in FIGS. 9-10, the pilot of a Beechcraft King Air (a twin-turboprop aircraft), after activating the fire extinguisher system to put out a fire in the engine, shuts down the engine, which slows the aircraft below single engine stall speed causing the aircraft to roll to the right in a tight spin. The aircraft is on two mile final at about 1000 feet above ground level. In order to continuously monitor the aircraft in step 312, the smart recovery system includes at least one loss of control sensor 316, vertical velocity sensor 318, altitude sensor 320, airspeed sensor 322, attitude sensor 324, and fire detection sensor 326. The data received by loss of control sensor 316, vertical velocity sensor 318, altitude sensor 320, airspeed sensor 322, attitude sensor 324, and fire detection sensor 326 is processed and stored in processor 314.

The data which is processed and stored in processor 314 is output at step 328 to various safety and flight control devices and/or systems aboard the aircraft, as shown in FIG. 10. The system will determine what safety and/or flight control devices and/or systems are available on the aircraft, and deploy the particular device and/or system in a manner to best address the in-flight emergency. As shown in Example 3 in FIG. 4, vertical velocity sensor 318, altitude sensor 320, airspeed sensor 322, and attitude sensor 324 detect that the twin-engine aircraft is operating on a single engine at low altitude, with low airspeed, or stalled at step 330. In that there is insufficient time to issue a warning in step 332 (the emergency is imminent) before taking control of the aircraft, the smart recovery system evaluates the situation at step 334 using vertical velocity sensor 318, altitude sensor 320, airspeed sensor 322, and attitude sensor 324. One wing of the aircraft is removed at step 336. Following separation of one wing of the aircraft at step 336, the wing parachute deploys at step 338 to slow the fall of the wing that was separated from the aircraft. As the aircraft moves toward upright, the other wing is removed at step 340. Following separation of the second wing at step 340, the second wing parachute deploys at step 342 to slow the fall of the second wing. Once both wings of the aircraft have been removed, the fuselage is horizontal and points down at step 344. In order to slow the fuselage, a fuselage parachute system is deployed at step 346.

It is understood that the components of the aircraft including, for example, the wings and fuselage, may be deployed in any sequence, depending upon, for example, the nature and severity of the emergency, without departing from the spirit of the present invention. Likewise, it is contemplated that the ballistic recovery system may deploy the parachutes for each component of the aircraft in any sequence, regardless of the order in which the components were jettisoned or separated.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. An aircraft recovery system comprising:
  a processor;
  at least one first environmental sensor configured to monitor at least one environmental condition of an aircraft communicating a signal representative of the at least one environmental condition to the processor;
  at least one second environmental sensor configured to monitor at least one environmental condition of the aircraft communicating a signal representative of the at least one environmental condition to the processor;
  at least one third environmental sensor configured to monitor at least one environmental condition of the aircraft communicating a signal representative of the at least one environmental condition to the processor; and
  at least one device disposed with the aircraft and configured to address an aircraft emergency, the at least one device communicating with the processor;

wherein the processor determines the presence of an in-flight emergency based on the representative signal from the at least one environmental sensor, the processor further identifying a device from the at least one device disposed with the aircraft to address the emergency; and the processor further deploying the device identified, wherein said at least one first environmental sensor is selected by the processor to operate in an automatic operation mode, said at least one second environmental sensor is selected by the processor to operate in a manual operation mode, and said least one third environmental sensor is selected by the processor to operate in both the automatic operation mode or the manual operation mode.

2. The system of claim 1 wherein the at least one first environmental sensor determines at least one of the group consisting of: altitude, airspeed, vertical velocity, and attitude.

3. The system of claim 1 wherein the identified device includes at least one from the group consisting of: fire suppression agents, fire extinguisher systems, flight control systems, parachutes, ballistic parachute recovery systems, drogue/drag chutes, pyrotechnic and electromechanical separation devices and actuators, rocket members, pyrotechnic or electronic time delays, sequencing devices, alarms and warning systems, and airbags.

4. The system of claim 1 further comprising at least one sensor configured to monitor pilot incapacitation or loss of control that communicates a signal representative of pilot incapacitation or loss of control with the processor, wherein the presence of an in-flight emergency is based on the representative signal from the at least one environmental sensor and/or the at least one sensor configured to monitor pilot incapacitation or loss of control.

5. The system of claim 1 further comprising at least one sensor configured to monitor conditions aboard the aircraft that communicates a signal representative of at least one condition aboard the aircraft with the processor, wherein the presence of an emergency is based on the representative signal from the at least one environmental sensor and/or the at least one sensor configured to monitor the conditions aboard the aircraft.

6. An aircraft recovery system comprising:
a processor;
at least one first environmental sensor configured to monitor at least one environmental condition of an aircraft communicating a signal representative of the at least one environmental condition to the processor;
at least one second environmental sensor configured to monitor at least one environmental condition of the aircraft communicating a signal representative of the at least one environmental condition to the processor;
at least one third environmental sensor configured to monitor at least one environmental condition of the aircraft communicating a signal representative of the at least one environmental condition to the processor;
at least one sensor configured to monitor pilot incapacitation or loss of control communicating a signal representative of pilot incapacitation or loss of control to the processor;
at least one sensor configured to monitor at least one condition aboard the aircraft communicating a signal representative of at least one condition aboard the aircraft to the processor; and
at least one device disposed with the aircraft and configured to address an emergency communicating with the processor;

wherein the processor:
determines the presence of an emergency based on information from at least one of the group of: the at least one environmental sensor to monitor the aircraft as it travels through the air, the at least one sensor to monitor pilot incapacitation or loss of control, and the at least one sensor to monitor the conditions aboard the aircraft; and
determines the presence of an emergency based on the signal representative of the at least one environmental sensor, the at least one sensor to monitor pilot incapacitation or loss of control, or the at least one sensor to monitor the conditions aboard the aircraft; the processor further identifying a device from the at least one device disposed with the aircraft to address the emergency; and the processor further deploying the device identified, and wherein said at least one first environmental sensor is selected by the processor to operate in an automatic operation mode, said at least one second environmental sensor is selected by the processor to operate in a manual operation mode, and said least one third environmental sensor is selected by the processor to operate in both the automatic operation mode or the manual operation mode.

7. The system of claim 6 wherein the at least one of the first, second and third sensor to monitor the conditions aboard the aircraft determines at least one from the group consisting of: fire, smoke, status of the control surfaces, and status of the flight controls.

8. The system of claim 1 wherein the devices and/or systems identified in response to an emergency are deployed automatically.

9. The system of claim 1 wherein at least one warning is issued prior to deploying the devices and/or systems identified in response to an emergency, the warning providing a given amount of time to which to respond and cancel the system from deploying the devices and/or systems identified in response to an emergency.

10. The system of claim 9 wherein the warning is audible.

11. The system of claim 9 wherein the warning is visible.

12. The system of claim 9 wherein the warning is both audible and visible.

13. The system of claim 1 wherein the processor communicates with the at least one environmental sensor via an electrical connection.

14. The system of claim 1 wherein the processor communicates with the at least one environmental sensor via an wireless connection.

15. The system of claim 1 wherein the processor communicates with the at least one device disposed within the aircraft via an electrical connection.

16. The system of claim 1 wherein the processor communicates with the at least one device disposed within the aircraft via an wireless connection.

17. A method for recovering an aircraft comprising:
obtaining information from at least one first environmental sensor configured to monitor at least one environmental condition of an aircraft, the at least one environmental sensor communicating a signal representative of the at least one environmental condition to a processor;
obtaining information from at least one second environmental sensor configured to monitor at least one environmental condition of an aircraft, the at least one environmental sensor communicating a signal representative of the at least one environmental condition to a processor;

obtaining information from at least one third environmental sensor configured to monitor at least one environmental condition of an aircraft, the at least one environmental sensor communicating a signal representative of the at least one environmental condition to a processor;

inputting information obtained from the at least one environmental sensor to the processor;

determining the presence of an emergency based on the representative signal from the at least one environmental sensor;

identifying at least one device disposed with the aircraft to address the in-flight emergency; and deploying the device identified, wherein said at least one first environmental sensor operates in an automatic operation mode, said at least one second environmental sensor operates in a manual operation mode, and said least one third environmental sensor operates in both the automatic operation mode or the manual operation mode.

18. The method of recovering an aircraft of claim 13 further comprising at least one sensor configured to monitor pilot incapacitation or loss of control communicating a signal representative of pilot incapacitation or loss of control to the processor, wherein the presence of an in-flight emergency is determined based on the representative signal from the at least one environmental sensor and/or the signal representative of pilot incapacitation or loss of control.

19. The method of recovering an aircraft of claim 14 further comprising at least one sensor configured to monitor at least one condition aboard the aircraft communicating a signal representative of at least one condition aboard the aircraft to the processor, wherein the presence of an emergency is determined based on the representative signal from the at least one environmental sensor and/or the signal representative of pilot incapacitation or loss of control and/or the signal representative of at least one condition aboard the aircraft.

20. The method of recovering an aircraft of claim 19 wherein the at least one sensor configured to monitor at least one condition aboard the aircraft determines at least one from the group consisting of: fire, smoke, status of the control surfaces, and status of the flight controls.

* * * * *